United States Patent
Pitts (10) Patent No.: US 8,379,562 B2
(45) Date of Patent: Feb. 19, 2013

(54) PAGING RELAY CONTROLLER AND METHODS THEREOF

(76) Inventor: Ian Pitts, Mesa, AZ (US)

( * ) Notice: Subject to any disclaimer, the term of this patent is extended or adjusted under 35 U.S.C. 154(b) by 212 days.

(21) Appl. No.: 12/902,982

(22) Filed: Oct. 12, 2010

(65) Prior Publication Data

US 2012/0087370 A1  Apr. 12, 2012

(51) Int. Cl.
*H04L 12/56* (2006.01)
*H04J 1/16* (2006.01)

(52) U.S. Cl. ......... 370/315; 370/252; 370/386; 370/486

(58) Field of Classification Search .................. 370/315, 370/252, 486, 386
See application file for complete search history.

(56) References Cited

U.S. PATENT DOCUMENTS

2004/0068583 A1* 4/2004 Monroe et al. ................ 709/246
2010/0333150 A1* 12/2010 Broerman et al. ............. 725/93

* cited by examiner

*Primary Examiner* — John Pezzlo
(74) *Attorney, Agent, or Firm* — Weiss & Moy, P.C.; Jeffrey D. Moy (57) ABSTRACT

The present application generally relates to a public address system, and more particularly, to a paging relay controller within the public address system and methods thereof. In an illustrative embodiment, the paging relay is configured through a dynamic host configuration protocol server. After configuration, the paging relay can process incoming network streams. The paging relay can receive an incoming network stream from a source typically in the form of a unicast stream. The stream can be transported over a wide area network that commonly does not support multicast transmissions. After receiving the unicast stream, the paging relay converts the unicast stream into a multicast stream. The paging relay then rebroadcasts the multicast stream over a local area network to local subscribing devices. In one embodiment, the paging relay can also convert the unicast stream to line level audio for transmission to an analog system via the RCA phono port.

16 Claims, 5 Drawing Sheets

PAGING RELAY CONTROLLER AND METHODS THEREOF

TECHNICAL FIELD

The present application generally relates to notifications, and more specifically, to a public address system having a paging relay controller for receiving a single unicast network stream from a source and rebroadcasting the stream onto a local area network as a multicast stream for local devices.

BACKGROUND

Public address systems provide notifications from one to many. In simpler forms, these systems include a standalone electronic amplification system having a mixer, amplifier and loudspeakers used to reinforce communications from a source. The communications can be distributed through a venue or building. Public address systems with a larger number of speakers are widely used in institutional and commercial buildings to read announcements or declare states of emergency. Intercom systems, which are often used in schools, also have microphones in each room so that the occupants can reply to the central office.

Using advancements in networking, the sophistication of public address systems have increased. Intercom systems began to use IP over Ethernet instead of a centralized amplifier to distribute communications from the source to paging locations in a building or campus. At each of the locations, network-attached amplifiers and intercom units are used to provide the communication function. In some applications, the individual modules can be addressable by an IP address just like any other computer on the network. Such systems are inter-connected by the networking infrastructure and allow less loss of transmission to remote locations across the Internet or a local area or campus network while leveraging the existing network infrastructure. These systems typically require multicast be enabled on the wide area network and local area network to function properly.

Nevertheless, wide area networks used within some public address systems cannot handle multicast transmissions from the source. Instead, these networks are meant to only handle unicast transmissions. Unicast transmissions across wide area networks can also be desired as to protect or keep track of the communications. Therefore, it would be beneficial to provide a public address system that works with such wide area networks as well as provide multicast transmission on the network segments that support it. These goals, as well as others, are accomplished by the present application which provides a solution that can be rapidly deployed and supported by the very latest unified communications platforms.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a system is provided. The system can include a paging relay for processing a network stream. The paging relay can be configured using a dynamic host configuration protocol, the configured paging relay receiving the network stream as a unicast stream from a source through a wide area network and rebroadcasted as a multicast stream to a local area network for local devices.

In accordance with another aspect of the present application, a computer-implemented method on a paging relay for providing notifications across an enterprise is provided. The method can include receiving a unicast transmission from a notification server over a wide area network. In addition, the method can include converting the unicast transmission into a multicast transmission. The method can also include broadcasting the multicast transmission over a local area network.

In accordance with yet another aspect of the present application, a paging relay controller is provided. The paging relay controller can include at least one processor and a memory operatively coupled to the processor, the memory storing program instructions which, when executed by the processor, causes the processor to perform processes. The processes can include receiving a unicast stream from an announce server through a wide area network, convert the unicast stream into a multicast stream, and relay the multicast stream to both a network and line-out ports for delivery to analog paging systems. The paging relay can also play a stored audio file from memory to both the network and line-out ports.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

The present application generally relates to a public address system, and more particularly, to a paging relay controller within the public address system for converting unicast transmissions into multicast transmissions. In an illustrative embodiment, the paging relay is configured through a dynamic host configuration protocol server. After configuration, the paging relay can process incoming network streams. The paging relay can receive an incoming network stream from a source typically in the form of a unicast stream through a wide area network. After receiving the unicast stream, the paging relay converts the unicast stream into a multicast stream and/or an analog audio simultaneously. The paging relay then rebroadcasts the multicast stream over a local area network to local subscribing devices and/or the analog-out RCA to connect with an analog audio system.

Numerous advantages can be provided through the paging relay briefly described above. The paging relay can offer organizations an enhanced solution with the ability to improve network-wide emergency and non-emergency responsiveness and communication. The addition of the paging relay into the public address system provides a true "single" network audio solution reducing the initial cost and eliminating long term maintenance of separate systems. Furthermore, as will become apparent, this solution can work with legacy endpoints. The paging relay can give an organization the tools to achieve optimal operational efficiency and deliver reliable, accurate notifications from any source to the appropriate devices. In addition to the embodiment described above, numerous other features regarding the paging relay will now be presented.

Operating Environment

Figure 1:
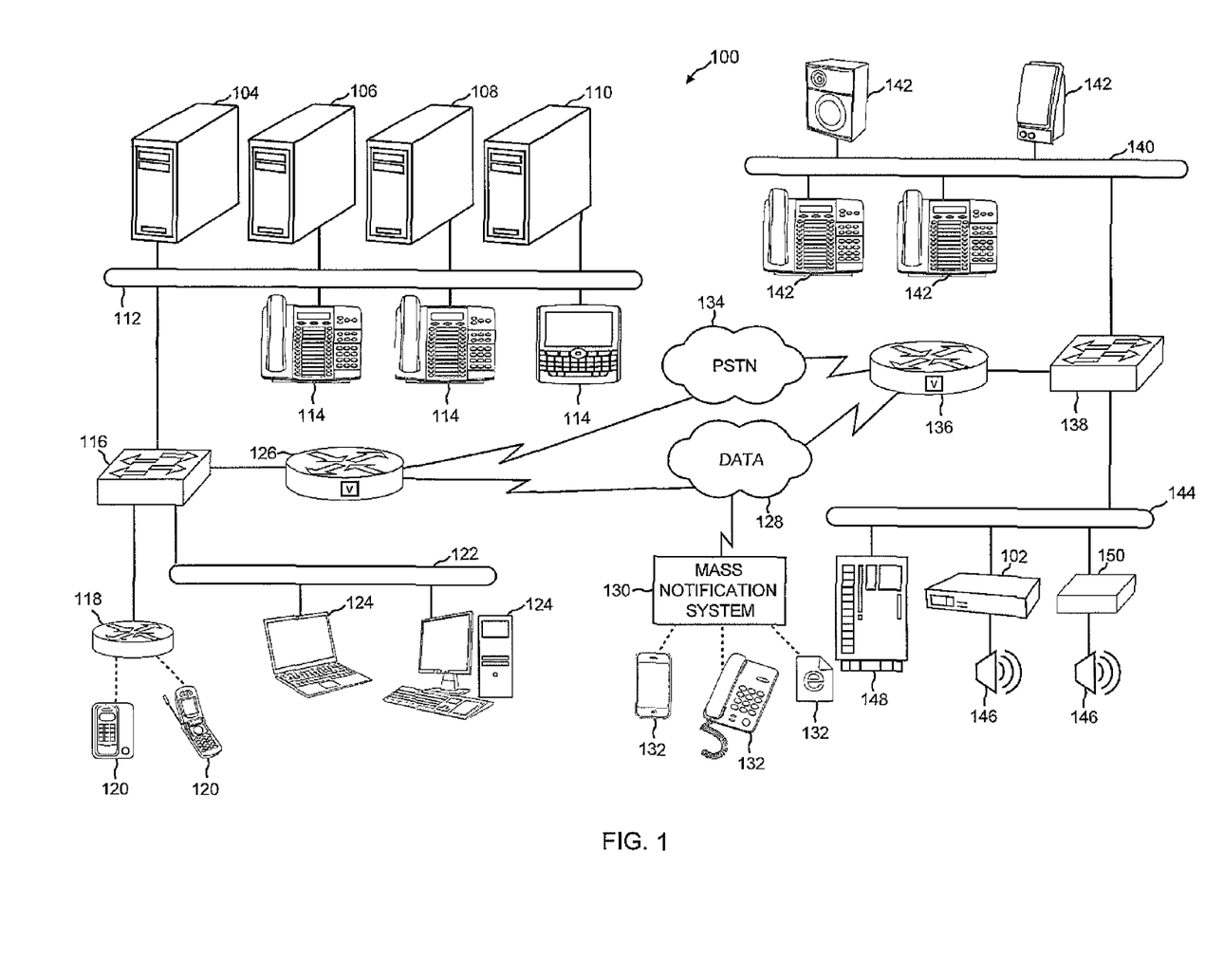
FIG. 1 depicts a typical notification system for an exemplary paging relay controller in accordance with one aspect of the present application.

With reference now to FIG. 1, a typical notification system 100 for an exemplary paging relay controller 102 in accordance with one aspect of the present application is provided. Notifications can be in real time, such as emergency alerts and live audio notifications (i.e. paging or intercom), or they can be scheduled via a scheduling system. The notification system 100 can support numerous streaming models that can be used to accommodate notification requirements from a centralized server. Streaming models can include audio, video, etc. Known to those skilled in the relevant art, fewer or more components can be present in the notification system 100 described below.

In a typical configuration, the notification system 100 can incorporate a number of servers 104, 106, 108 and 110 that interact with communication sources 114. A notification server 104 can be provided within the notification system 100. Furthermore, a unified communications manager server 106 and email server 110 can also be provided. In one embodiment, an Alertus® server 108 or similar device can be provided. Those skilled in the relevant art will appreciate that each of these servers 104, 106, 108, and 110 can contribute towards processing and managing communications from a source 114 or multiple sources 114. As will be shown below, communications can also be provided through other devices 120, 124 and 142.

The servers 104, 106, 108, and 110 can be connected to a local area network (LAN) 112. In one embodiment, the LAN 112 can handle voice communications. Attached to the LAN 112 can be a series of sources 114 that provide communications. The sources 114 can include, but are not limited to, an XML enabled phone 114, IP phone 114, etc. An Alertus® beacon 114 or similar device can be provided as one of the sources 114. The Alertus® beacon 114 can connect to the Alertus® server 108.

Continuing with FIG. 1, a network switch 116 can be coupled to the LAN 112. The network switch 116 can receive communications from the LAN 112 and act as a hub for connecting network segments. The network switch 116 can be connected to a wireless network access point 118. To provide a robust notification system 100, the communications can be provided to local devices. In one embodiment, the wireless access point 118 can be coupled to a wireless IP phone 120, cellular phone 120, or the like. These devices 120 can also provide communication sources.

The network switch 116 can also be connected to a LAN 122. The LAN 122 can be used for data communications. This LAN 122 can be coupled to an IP communicator software package that is installed on a desktop or laptop PC 124. In addition, the LAN 122 can also be connected with email services on a desktop or laptop PC 124, or other computing device. Through the LAN 122, a source for data can be integrated into the notification system 100.

Connected to the network switch 116 can be a router 126. The router 126 can supply communications to a public switched telephone network (PSTN) 134 and a data network 128. Through the networks 128 and 134, the notification system 100 can be integrated with a large number of disparate end points such as IP phones, legacy overhead systems, IP speakers, email, paging relays, and Alertus® devices. In some embodiments presented below, the PSTN 134 and data network 128 can be distributed through a wide area network.

In one embodiment, the data network 128 can be connected to a number of end points through a mass notification system 130. The mass notification system 130 can be provided by Everbridge® (formerly 3n®) or many other mass notification systems. Subscribing devices 132 can rapidly communicate with each other through such platforms 130. These devices can include, but are not limited to, a cell phone 132, land lines 132, and email 132, to name a few.

Both the data network 128 and the PSTN 134 can be connected to a router 136. In turn, the router 136 can be connected to a network switch 138. The network switch 138 can be connected to a LAN 140 that can handle voice communications. The LAN 140 can provide voice communications to IP phones 142. These phones 142 can be XML enabled. The LAN 140 can also be connected to IP speakers 142, for example Cyberdata®, Valcom®, AND/DDC®, or Atlas® IP speakers 142. Known to those skilled in the relevant art, numerous other types of devices can receive voice communications from the LAN 140, and those described above representative a small, limited number.

The network switch 138 can also be coupled to a LAN 144. The LAN 144 can provide data received from the data network 128. The data network 144 can be coupled to a converter 150 which can lead to speakers 146. The speakers 146 can be legacy speakers 146. In one embodiment, a dynamic host configuration protocol (DHCP) server 148 can be coupled to the LAN 144. The DHCP server 148 can configure the paging relay 102, both of which will be described in further details below. A further communication server 150 can be coupled to the LAN 144 and in turn, the server 150 can be connected to a speaker 146 or multiple speakers 146.

In operation, notifications can be made by simply picking up a source phone 114, 120, 124 and 142 and dialing a notification group directory number that is configured on the unified communications server 106. With the addition of the paging relay 102, even non-multicast enabled wide area networks can provide notification to all remote sites using one centralized server. Streaming models include unicast, server sourced multicast, and phone sourced multicast.

Using the notification system 100, parties can be automatically alerted so they can stay calm and focused on resolving any situations that can arise. Mass communications can be made to students, faculty, administrators, employees, and any other person whether they are on campus or off-site. Furthermore, the system 100 can extend the value of existing IP phone systems. This system 100 can also leverage existing alert and communications investments by seamlessly integrating it with new IP-based technology. It can integrate on-premise systems with third-party notification providers, paging systems, and PBXs to deliver a single notification solution. The notification system 100 can broaden the reach of messages by publishing notifications to sites such as Facebook®, Twitter®, and others.

The notification system 100 can be used for typical public address systems as described earlier. Some areas where the notification system 100 can be used are in educational institutions, retail, manufacturing, IT services, legal, hospitals, health care, financial, government, construction, transportation, etc. For purposes of illustration, a set of examples will now be provided to show operations of the paging relay 102. These examples are given so that a general understanding of this application can be appreciated by those skilled in the relevant art. They should not be construed as limiting to the present application. The examples begin by showing processes for a typical unicast to multicast transmission. Continuing, the examples show other uses for such conversions. While the examples are shown individually, they can be combined as well.

Paging Relay

Multiprotocol label switching (MPLS) is a mechanism in high-performance telecommunications networks which directs and carries data from one network node to the next. MPLS can make it easy to create "virtual links" between distant nodes. It can encapsulate packets of various network protocols. MPLS does not by default support the multicast protocol Generally described, the paging relay 102 can circumvent this limitation by removing the multicast transmission from the wide area network and instead receive unicast communications from the notification server 104. This can allow the network to get the benefit of multicast where it is supported while intelligently managing the amount of bandwidth that is used on the wide area network. The paging relay 102 hardware incorporates an application that can receive unicast transmissions and convert them into multicast transmissions.

When multiple devices are meant to be reached and they are located on the same network, then a simple unicast transmission can be sent to the paging relay 102, whereby the paging relay 102 can then retransmit the communication to those devise that are locally connected via the multicast protocol. Because the RTP audio is kept local, no real-time transport protocol (RTP) is required to traverse the wide area network. Furthermore, this reduces the RTP payload and bandwidth across the wide area network. Each network that is supposed to receive can listen to the paging relay 102. As will be shown, these devices can be connected into a LAN 144, or if analog, into the paging relay 102. If it is an analog system, then the device goes to the RCA phono plug in the paging relay 102. Operatively, a call can be placed and sent to the paging relay 102 that can then send the communication to a number of end points such as the IP speakers, phones, analog systems, etc.

Figure 2:
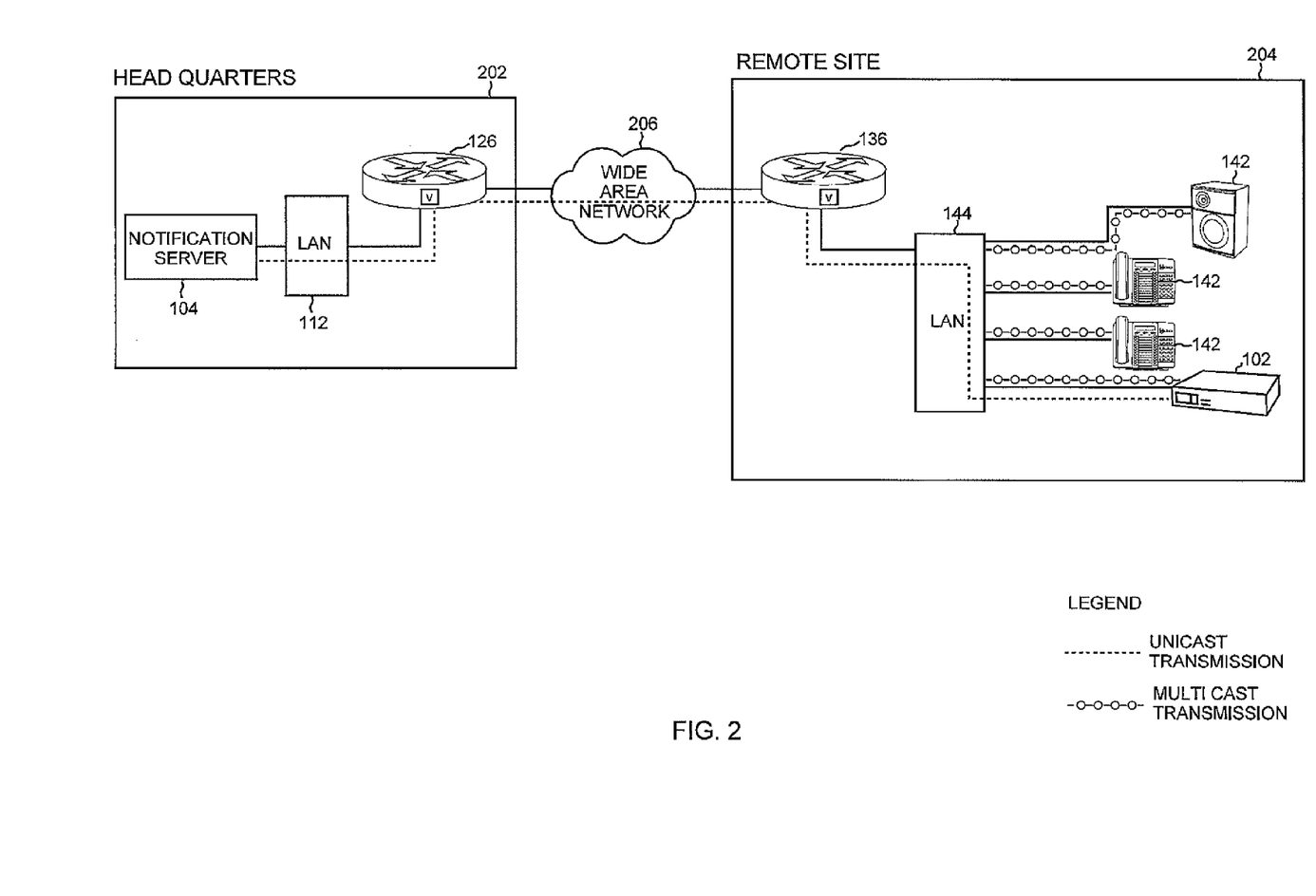
FIG. 2 is a block diagram showing illustrative processes for converting a unicast transmission to a multicast transmission in accordance with one aspect of the present application.

Turning now to FIG. 2, a block diagram showing illustrative processes for converting a unicast transmission to a multicast transmission in accordance with one aspect of the present application is provided. The processes can be performed by software, hardware, or a combination of both as shown in the FIGURES. The hardware of the paging relay 102 can include a free standing device that is placed at a remote site 204 that connects to a LAN 144 via a single network cable. The paging relay 102 can receive power from the network 206 via the POE standard 802.3af or 802.3at. The physical device can provide the following connection ports: 1×RJ45 Ethernet port, 2×RCA, and 1× power connector.

While a number of components were shown above, in FIG. 2, fewer components are shown to provide an understanding of the processes for the paging relay 102. Communications can be provided by a central location, and labeled headquarters 202. Known to those in the skilled in the relevant art, the headquarters 202 can be referred to as other terms that denote a place where the communications or sources 114 can originate. Within the headquarters 202 can be a notification server 104. The notification server 104 can receive communications from numerous sources 114 including an IP phone, Alertus® beacon, etc.

The communications provided by the sources 114 via the notification server 104 can be provided to a LAN 112. In turn, the LAN 112 can provide the communications to a router 126. The notification system 100 can work with a network 206 for transferring the communication. Typically, the network 206 is a wide area network that can only handle unicast transmissions. The communication is provided over the network 206 as a single unicast RTP network stream, in some embodiments.

The unicast stream can then be received by a remote site 204. The remote site 204 can be a room, building, or other location where the communication is sent. Typically, the remote site 204 includes a router 136 to receive the unicast stream. The router can thereafter pass the unicast communication to the paging relay 102. The notification server 104 targets the paging relay 102 where it sends the unicast stream, as shown in FIG. 2.

In this embodiment, the paging relay 102 can then convert the unicast stream into a multicast stream. This can take the unicast stream that was meant for multiple end point devices 142 and direct that unicast stream into a single point, the paging relay 102. From there, the paging relay 102 routes the multicast stream to other local devices 142. The stream can be rebroadcasted as a multicast RTP audio stream, video stream, or other type of data stream.

In the shown embodiment, the multicast streams are provided back to the LAN 144 on the remote site 204. This allows the local devices that need to listen to this stream to subscribe to the multicast feed originated by the local paging relay 102 without requiring multicast support on a wide area network 206.

Advantages of having a separate hardware component added into the notification system 100 allows a unicast stream to be transported where only a unicast stream can be supported. Further, security is provided as the stream is directed to a single device instead of a number of devices. This removes the overhead associated with keeping track of multicast transmissions. This allows local devices that need to listen to this stream to subscribe to the multicast feed originated by the local paging relay 102 without requiring multicast support on a wide area network 206.

This allows the paging relay 102 to receive a single unicast RTP network stream from an implementation of a notification system 104 at the headquarters 202 located across a wide area network 206 and convert and rebroadcast the RTP audio stream onto the LAN 144 as a multicast RTP audio stream. This allows local devices to listen to this stream to subscribe to the multicast feed originated by the local paging relay 102 without requiring multicast support on a wire area network 206. Furthermore, this system 100 eliminates the need to enable multicast across a wide area network 206 to remote locations for notifications to prevent all audio from traversing the wide area network 206. If multiple paging relay controllers 102 need to be included in an audio broadcast, the notification server 104 can send a single unicast stream to each paging relay 102 in the network and instruct it to rebroadcast the audio to a multicast address. Generally, audio is delivered to the paging relay 102 and relayed to both the network and the line-out ports on the rear of the device 102 for delivery to analog paging systems. Minimal configuration is typically required since the paging relay 102 can auto register if a dynamic host configuration protocol server 148 is configured to deliver the announce server 104 IP address via option 72. All logic to control the paging relay 102 is embedded into the notification server 104 making the paging relay 102 a device that is dependent on the logic embed in the notification server 104.

Figure 3:
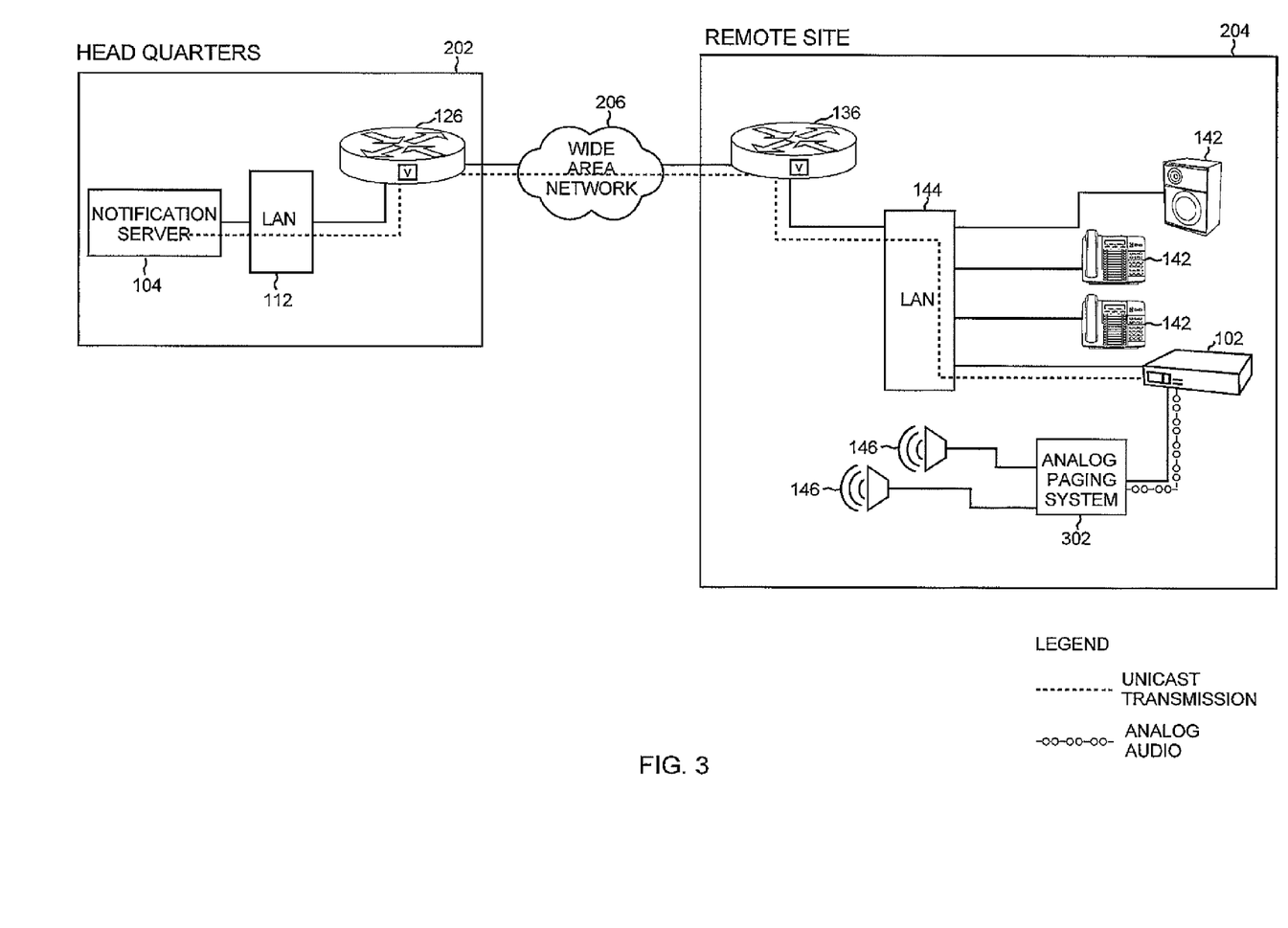
FIG. 3 is a block diagram showing illustrative processes for converting a unicast transmission in accordance with one aspect of the present application.

FIG. 3 is a block diagram showing illustrative processes for converting a unicast transmission in accordance with one aspect of the present application. In this embodiment, communications can be provided by a notification server 104 located at a central site such as a headquarters 202. It can be provided as a unicast transmission to the LAN 112 and then the router 126.

The unicast transmission can be communicated through the wide area network 206. In turn, the unicast transmission is received by a router 136 at the remote site 204. The unicast transmission is received at the LAN 144. The paging relay 102 can receive the unicast transmission. As shown in the previous embodiment, the transmission was converted to multicast and then provided to local devices 142 via the LAN 144. In this embodiment, however, the unicast RTP transmission can be converted into an analog stream and then be sent to an analog paging system 302. More than one analog paging system 302 can be provided. This provides the ability for the paging relay 102 to receive a single unicast RTP network stream from an implementation of a notification system located across a wide area network 206 and convert and rebroadcast the RTP audio stream out the RCA out connector to facilitate the interconnection of standard analog overhead paging systems 302 that support inbound line level audio from an RCA cable. An example of one paging system can be a speaker 146.

Figure 4:
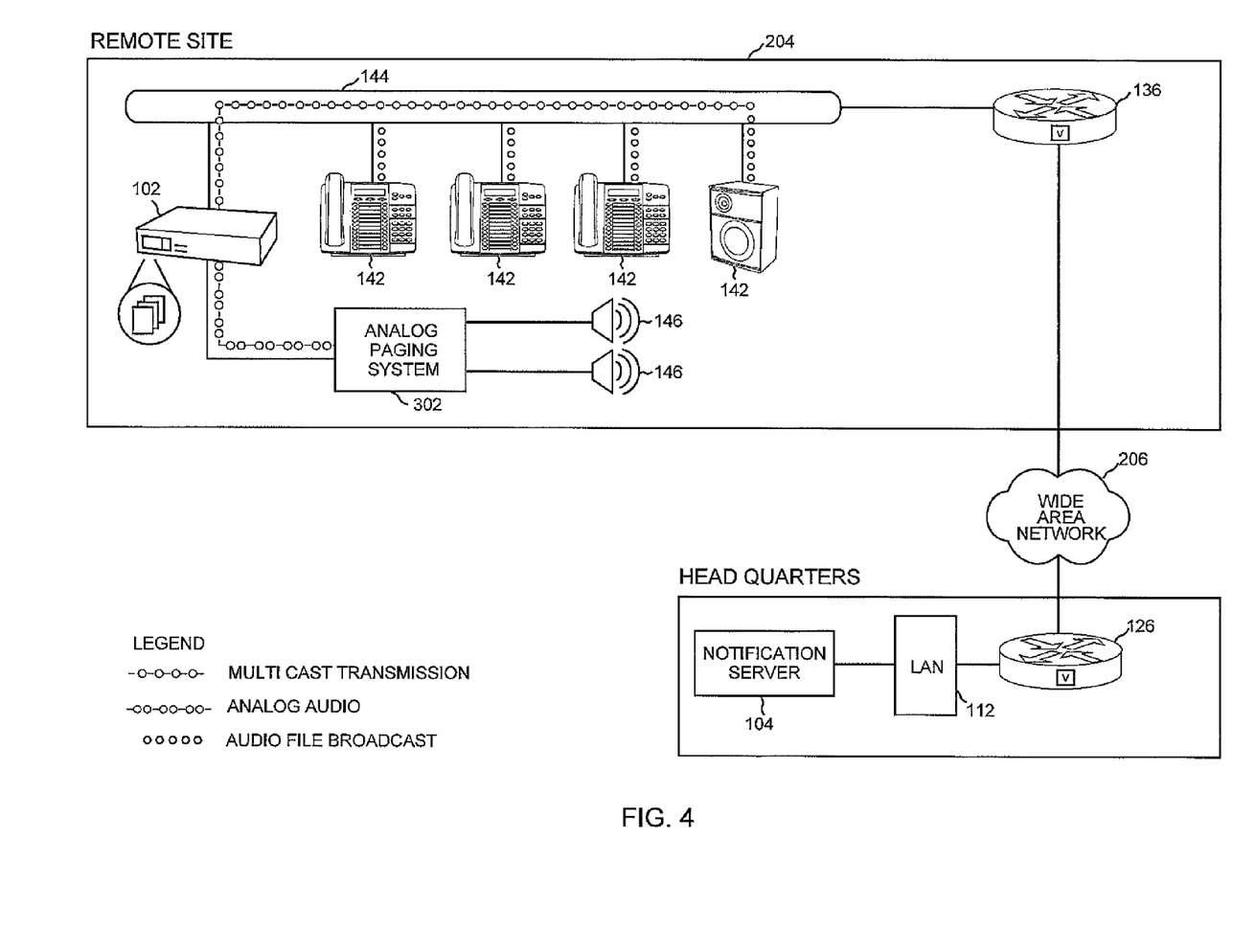
FIG. 4 is a block diagram showing illustrative processes for broadcasting an audio file to a network via a multicast stream while simultaneously broadcasting the audio file out to an analog system in accordance with one aspect of the present application.

Referring now to FIG. 4, a block diagram showing illustrative processes for broadcasting an audio file to a network via a multicast stream while simultaneously broadcasting the same audio file out to an analog system in accordance with one aspect of the present application is provided. Typically, the local audio file can be stored on the paging relay 102 located at the remote site 204 or another location. This embodiment of the system 100 provides the ability for the paging relay 102 to broadcast a locally stored G. 711 encoded audio file, or other type of audio file, out to the network via a multicast stream while simultaneously broadcasting the same audio file out the RCA port to an analog system without the need of a unicast stream from the central notification server 104.

As shown, the paging relay 102 can provide the audio file broadcast over the LAN 144 to phones 142 or speakers 142. In one embodiment, the audio file can be directed to other systems connected to the wide area network 206 through router 136. The paging relay 102 can also transport the audio file to an analog paging system 302. The audio can then be provided to one or more speakers 146.

Figure 5:
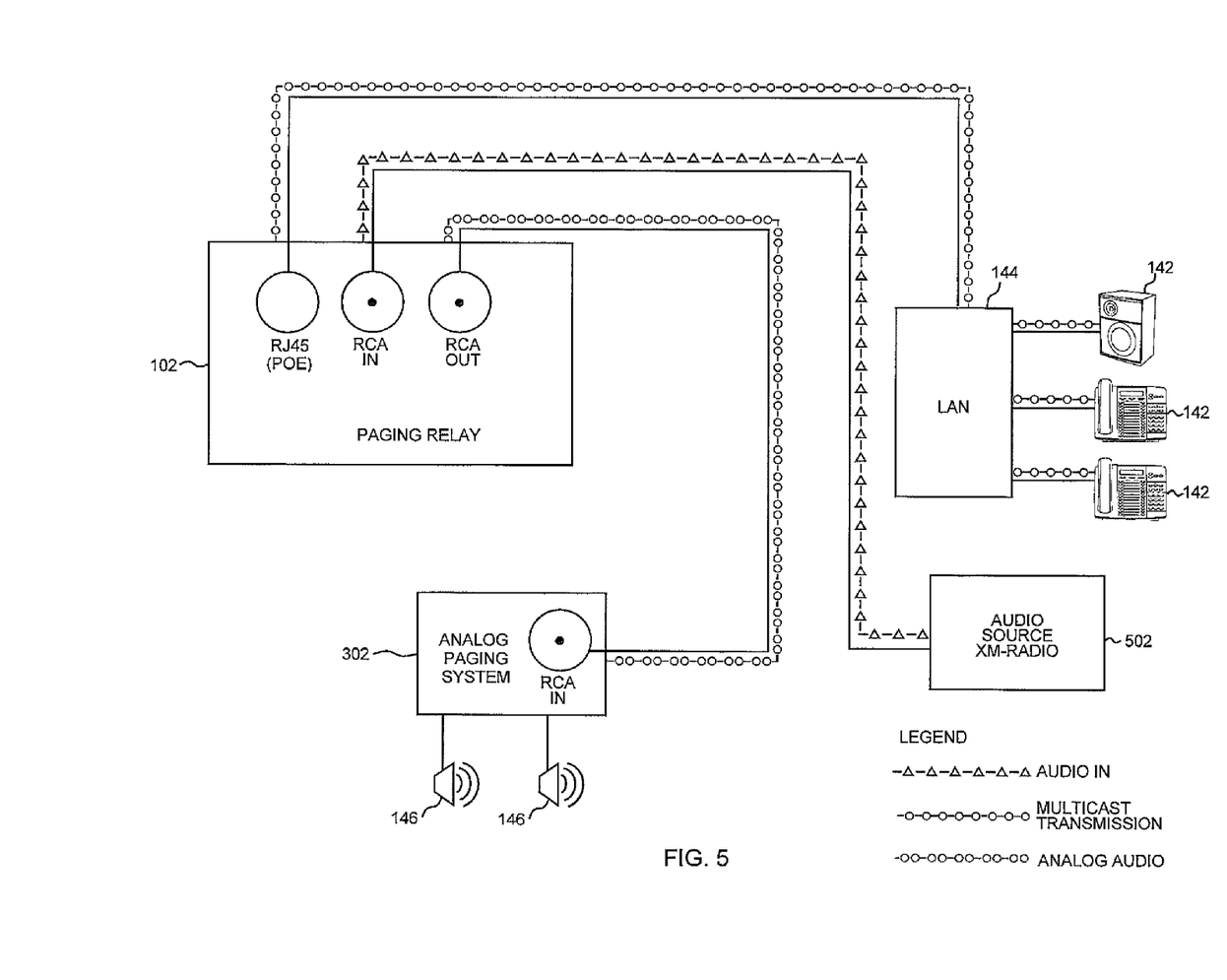
FIG. 5 is a block diagram showing illustrative processes for using an RCA port as an input source to allow rebroadcast from a physical audio player to both the network as a multicast stream and the analog RCA output port to be played on an analog audio system in accordance with one aspect of the present application.

FIG. 5 is a block diagram showing illustrative processes for using an RCA port as in input source for allowing the rebroadcast from a physical audio player to both the network as a multicast stream and the analog RCA output port to be played on an analog audio system in accordance with one aspect of the present application. In this embodiment, the paging relay 102 can facilitate a background music or audio broadcast. The paging relay 102 can leverage one of the RCA ports as in input source to allow the rebroadcast from a physical audio player to both the network as a multicast stream and the analog RCA output port to be played on analog audio systems.

In more detail, the paging relay 102 includes an RJ45 port, an RCA IN port, an RCA OUT port, and a power connection port. Audio can be provided through the RCA IN port on the paging relay 102. The audio can be supplied by an audio source such as an XM radio 502. The paging relay 102 can convert the input audio from the RCA IN port to a multicast transmission. The multicast transmission can be sent out the RJ45 port to the LAN 144. From there, the LAN 144 can broadcast the multicast transmission to the speakers 142, phones 142, etc.

The audio transmission from the RCA IN can also be broadcasted out the RCA OUT port of the paging relay 102. This allows multiple types of transmissions. The audio from the RCA OUT port can be provided to an analog paging system 302. The analog paging system 302 can have an RCA IN port or other connection for receiving the audio from the paging relay 102. The analog paging system 302 can then provide the proper audio conversions such that the audio can be provided to one or more speakers 146.

While numerous processes for the paging relay 102 were described above, those skilled in the relevant art will appreciate that fewer or more processes can be used. Furthermore, the paging relay 102 can incorporate one or more of the described functionalities.

Self Provisioning

Within the system 100, a self provisioning functionality can be provided. This feature can allow the network device to query a local dynamic host configuration protocol server 148 and solicit the data stored in Option 72. The IP addresses returned in Option 72 from the dynamic host configuration protocol server 148 can be the locations of the installed notification systems. The devices can then automatically register with the notification servers 104 located at each address returned by Option 72.

Advantages of using the dynamic host configuration protocol server 148 can be to eliminate the need for manual intervention from the end user when deploying paging relay controllers 102. By deploying paging relays 102 at each remote site, the notification server can prevent audio from traversing the wide area network 206. If multiple paging relay controllers 102 need to be included in an audio broadcast, the notification server can send a single unicast stream to each paging relay 102 in the system 100 and instruct it to rebroadcast the audio to a multicast address.

Audio can be delivered to the paging relay 102 and transmitted to both the network and the line-out ports on the rear of the device 102 for delivery to analog paging systems or other analog systems. Minimal configuration is necessary since the paging relay 102 can auto register if the DHCP server 148 is configured to deliver the notification server 104 IP address via Option 72. Those skilled in the relevant art will appreciate that there can be numerous types of methods to configure the paging relay 102. In one embodiment, the paging relay 102 can be configured manually from an embedded web server.

Systems, Methods and Operations

In accordance with one aspect of the present application, a system is provided. The system can include a paging relay for processing a network stream. The paging relay can be configured using a dynamic host configuration protocol, the configured paging relay receiving the network stream as a unicast stream from a source through a wide area network and rebroadcasted as a multicast stream to a local area network for local devices.

In one embodiment, the local devices can subscribe to the multicast stream broadcasted by the paging relay. In one embodiment, the wide area network supports only unicast network streams. In one embodiment, the network stream can be an audio stream. In one embodiment, the network stream can be a data stream. In one embodiment, the network stream can be a video stream. In one embodiment, the paging relay can receive power using a power over Ethernet standard such as 802.3af or 802.3at.

In one embodiment, the unicast stream and multicast stream can be provided through a real-time transport protocol. In one embodiment, the notification server can send the unicast stream to the paging relay instructing the paging relay to rebroadcast the unicast stream to a multicast address.

In accordance with another aspect of the present application, a computer-implemented method on a paging relay for providing notifications across an enterprise is provided. The method can include receiving a unicast transmission from a notification server over a wide area network. In addition, the method can include converting the unicast transmission into a multicast transmission. The method can also include broadcasting the multicast transmission over a local area network.

In one embodiment, the multicast transmission can be broadcasted to at least one endpoint connected to the local area network. In one embodiment, at least one endpoint can include a number of disparate end points. In one embodiment, the unicast transmission can be received when a user of the notification system dials a notification group directory number associated with the paging relay. In one embodiment, the wide area network provides only unicast transmissions.

In one embodiment, the unicast transmission can be an emergency alert. In one embodiment, the unicast transmission can be a live audio notification.

In accordance with yet another aspect of the present application, a paging relay controller is provided. The paging relay controller can include at least one processor and a memory operatively coupled to the processor, the memory storing program instructions which, when executed by the processor, causes the processor to perform processes. The processes can include receiving a unicast stream from a notification server through a wide area network, convert the unicast stream into a multicast stream, and relay the multicast stream to both a network and line-out ports for delivery to analog paging systems.

In one embodiment, the memory storing program instructions, when executed by the processor, can cause the processor to configure the paging relay controller using a dynamic host configuration protocol. In one embodiment, the dynamic host configuration protocol automatically configures the paging relay controller when the dynamic host configuration protocol is configured to deliver an IP address of the notification server via option 72. In one embodiment, the notification server can send a unicast stream to each paging relay controller to rebroadcast in a multicast stream.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system comprising:
   a paging relay for processing a network stream;
   wherein said paging relay is configured using a dynamic host configuration protocol, said configured paging relay receiving said network stream as a unicast stream from a source through a wide area network and rebroadcasted as a multicast stream to a local area network for local devices, and wherein said paging relay receives power using a power over Ethernet standard.

2. The system of claim 1, wherein said local devices subscribe to said multicast stream broadcasted by said paging relay.

3. The system of claim 1, wherein said wide area network supports only unicast network streams.

4. The system of claim 1, wherein said network stream is an audio stream.

5. The system of claim 1, wherein said network stream is a data stream.

6. The system of claim 1, wherein said network stream is a video stream.

7. The system of claim 1, wherein said unicast stream and multicast stream are provided through a real-time transport protocol.

8. The system of claim 1, wherein a notification server sends said unicast stream to said paging relay instructing said paging relay to rebroadcast said unicast stream to a multicast address.

9. A computer-implemented method on a paging relay for providing notifications across an enterprise, said method comprising:
   receiving a unicast transmission from a notification server over a wide area network;
   converting said unicast transmission into a multicast transmission; and
   broadcasting said multicast transmission over a local area network;
   wherein said unicast transmission is received when a user of said notification system dials a notification group directory number associated with said paging relay.

10. The computer-implemented method of claim 9, wherein said multicast transmission is broadcasted to at least one endpoint connected to said local area network.

11. The computer-implemented method of claim 10, wherein said at least one endpoint comprises a number of disparate end points.

12. The computer-implemented method of claim 9, wherein said wide area network provides only unicast transmissions.

13. The computer-implemented method of claim 9, wherein said unicast transmission is a live audio notification.

14. A computer-implemented method on a paging relay for providing notifications across an enterprise, said method comprising:
   receiving a unicast transmission from a notification server over a wide area network;
   converting said unicast transmission into a multicast transmission; and
   broadcasting said multicast transmission over a local area network;
   wherein said unicast transmission is an emergency alert.

15. A paging relay controller comprising:
   at least one processor; and
   a memory operatively coupled to said processor, said memory storing program instructions which, when executed by said processor, causes said processor to:
      receive a unicast stream from an announce server through a wide area network;
      convert said unicast stream into a multicast stream;
      relay said multicast stream to both a network and line-out ports for delivery to analog paging systems;
   wherein said memory storing program instructions, when executed by said processor, causes said processor to configure said paging relay controller using a dynamic host configuration protocol;
   wherein said dynamic host configuration protocol automatically configures said paging relay controller when said dynamic host configuration protocol is configured to deliver an IP address of said announce server via option 72.

16. The paging relay controller of claim 15, wherein a notification server sends a unicast stream to each paging relay controller to rebroadcast in a multicast stream.

\* \* \* \* \*